United States Patent
Wang et al.

(10) Patent No.: US 7,499,650 B2
(45) Date of Patent: Mar. 3, 2009

(54) OPTICAL BURST SWITCHING NODE WITH INTERNAL SPEEDUP

(75) Inventors: Sheng Wang, Chengdu (CN); Huan Song, Chengdu (CN); Du Xu, Chengdu (CN); Wei Tan, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 853 days.

(21) Appl. No.: 10/926,236

(22) Filed: Aug. 26, 2004

(65) Prior Publication Data

US 2005/0152351 A1   Jul. 14, 2005

(30) Foreign Application Priority Data

Jan. 14, 2004   (CN)   ................. 2004 1 0021668

(51) Int. Cl.
*H04J 14/00* (2006.01)
(52) U.S. Cl. .............. 398/53; 398/45; 398/49; 398/50; 398/56
(58) Field of Classification Search ............ 398/49, 398/50, 51, 53, 56, 45, 48
See application file for complete search history.

(56) References Cited

U.S. PATENT DOCUMENTS

| | | | | |
|---|---|---|---|---|
| 5,469,284 | A * | 11/1995 | Haas | 398/54 |
| 5,734,486 | A * | 3/1998 | Guillemot et al. | 398/54 |
| 6,519,062 | B1 * | 2/2003 | Yoo | 398/49 |
| 6,577,425 | B1 * | 6/2003 | Martinelli et al. | 398/54 |
| 6,888,664 | B2 * | 5/2005 | Lee et al. | 359/326 |
| 6,925,257 | B2 * | 8/2005 | Yoo | 398/47 |
| 7,200,340 | B2 * | 4/2007 | Beshai et al. | 398/161 |
| 2004/0042796 | A1 * | 3/2004 | Con-Carolis et al. | 398/83 |

OTHER PUBLICATIONS

Tancevski, L., et al. "Optical Packet Switch with Partially Shared Buffers: Design Principles". 3 pages.
Xiong, Y., et al. "Control Architecture in Optical Burst-Switched WDM Networks". IEEE Journal on Selected Areas in Communications, vol. 18, No. 10, Oct. 2000. pp. 1838-1851.
Masetti, F., et al. "Design and Implementation of a Multi-Terabit Optical Burst/Packet Router Prototype". 3 pages.
Qiao, C., et al. "Optical Burst Switching (OBS)—A New Paradigm For An Optical Internet". Lab for Advanced Network Design, Evaluation and Research (Lander) . 24 pages.
Papadimitriou, G., et al. "Optical Switching: Switch Fabrics, Techniques, and Architectures". Journal of Lightwave Technology, vol. 21, No. 2, Feb. 2003. pp. 384-405.
Jajszczyk, A., et al. "Photonic Fast Packet Switching". IEEE Communications Magazine. Feb. 1993, pp. 58-65.
Jajszczyk, A., et al. "Photonic Fast Packet Switching". IEEE Comunications Magazine. Feb. 1993, pp. 58-65.

* cited by examiner

*Primary Examiner*—Kenneth N Vanderpuye
*Assistant Examiner*—Hibret A Woldekidan
(74) *Attorney, Agent, or Firm*—The Nath Law Group; Jerald L. Meyer; Jiaxiao Zhang

(57) ABSTRACT

A multiple-plane OBS node comprises N input ports, N 1×N switches, N switching planes, $N^2$ FDLs, N optical couplers, and N output ports, each input port is connected with the input of a corresponding 1×N switches, the N outputs of each 1×N switch are connected with a corresponding input of each switching plane respectively, a corresponding output of each switching plane is connected with the input of the same corresponding optical coupler via a respective FDL, and each output port is connected with the output of a corresponding optical coupler, wherein N is an integer.

2 Claims, 5 Drawing Sheets

OPTICAL BURST SWITCHING NODE WITH INTERNAL SPEEDUP

FIELD OF THE INVENTION

The invention relates to optical communication and more specifically to the design of switching architecture and optical buffer of core switching node in Optical Burst Switching.

DESCRIPTION OF RELATED ART

Circuit switching and packet switching are two primary technologies for current telecommunication networks. With the rapid development and application of DWDM (Dense Wavelength Divided Multiplex) and relevant optical devices, it is a trend to provide switching capabilities over WDM networks directly. Optical Circuit Switching (also called wavelength routing) has been studied extensively and intensively, and Optical Packet Switching is proposed for the next generation optical Internet. But the two technologies have respective drawbacks. On one side, the exponential growth of the network traffic focuses the interests of future networks on how to support packet traffic or service optimally, which the wavelength routing technology cannot support effectively. On the other side, optical packet switching still faces many technical challenges in its implementation, such as lack of efficient optical logic devices, immaturity of optical buffer and difficulty in optical domain synchronization. However, OBS (Optical Burst Switching) reveals a promising future by combining the advantages of the above two switching schemes. Table 1 compares the three switching technologies and shows that OBS is superior to wavelength routing in supporting the packet traffic and is advantageous over optical packet switching in implementation.

TABLE 1

Comparison of the three optical switching technologies

| | Wavelength routing | Optical packet switching | OBS |
|---|---|---|---|
| Switching granularity | Per link for per request | Single packet | Burst composed of several packets |
| Duration | Large | Small | Medium |
| Bandwidth usage | Low | High | Medium |
| Optical buffer | No | Necessary | Optional |
| Suitability for packet traffic | Low | High | Medium |
| Complexity in implementation | Low | High | Medium |

In OBS, a burst can be regarded as an elongated data packet composed of some IP packets, whose header is called BHP (Burst Header Packet). Contrary to the conventional packet switching, a BHP and its payload (i.e. a data burst) are separately transmitted with different wavelengths on the physical channel. In a DWDM transmission system, one or more specific wavelengths can be used as control channel for transmitting BHP, and other wavelengths can be used as data channel. A BHP uniquely corresponds with a data burst (hereinafter referred to as a burst). The offset time between the BHP and its burst, i.e. the interval between the departure of the BHP and the burst from an edge node, is set at the edge node. BHP includes information concerning the burst, such as offset time, burst length, data channel wavelength, and so on. At an intermediate node, BHP is converted to an electronic signal, which is processed electronically for the purpose of routing establishment, resource reservation, and switching matrix configuration. When the burst arrives, relevant data channels have been well configured so that transparent transmission of data can be achieved in optical domain.

Functionally, BHP is similar to the signaling in conventional circuit switching networks, as a result, BHP is also called signaling message. However, for OBS signaling, it is not necessary to wait feedback acknowledgement from the destination. In other words, OBS adopts one-way resource reservation, which can decrease the time delay for each connection establishment and improve channel usage.

A typical OBS network includes edge nodes, core nodes and DWDM links, as illustrated in FIG. 1. The edge node buffers and encapsulates the data packets, assemblies them into bursts, and then sends the bursts to the nearest OBS core node. At the time of encapsulating, the edge node generates a BHP describing burst characteristics and sends it on specific control channel before sending the burst. The core node, according to the BHP received on the control channel, obtains control information of the burst (e.g. arriving time, duration, destination address, etc.), and based on such information, completes configuration of optical routes, thereby ensuring transparent data channel.

When performing optical switching at core nodes, there exists contention, when several bursts contend for the same wavelength of the same output port simultaneously. To resolve contention and prevent data lose, several contention resolution schemes have been proposed, e.g., wavelength conversion and buffering (also known as fiber delay line, FDL), but each scheme has its shortcoming respectively.

Wavelength Conversion: Wavelength conversion uses tunable wavelength converter (TWC) to convert optical signals from one wavelength to another. When several bursts of identical wavelength are to be switched to the same wavelength of the same output port simultaneously, TWC converts the contending burst(s) to free wavelength(s) at the output port, thereby preventing contend. This approach has certain drawback, since the effect of contend resolving is not satisfactory when traffic load is heavy. Further, TWC is expensive. Therefore, the contend issue can not be fully addressed merely by wavelength conversion.

Buffering: since bursts are completely processed in optical domain without optical-electrical-optical (OEO) conversion, optical buffering should be adopted. At present, optical buffering can only be achieved by fiber delay line.

For convenience of description, we provide the following definitions:

Basic Delay Unit: the minimum nonzero delay time that a FDL can provide.

1×N switch: a switch with 1 input port and N (N is an integer) output ports, which can switch a signal from the input port to any output port.

The current FDL design is illustrated in FIG. 2, which is composed of a 1×N switch, optical fibers with various lengths and an optical coupler. It can provide delay time in a range from 0 to B=(N−1)×b, wherein b is the basic delay unit.

Using this kind of FDL, the buffering time of an incoming burst will be determined according to the availability of the FDL's output port (whether there is a burst being transmitted), then the 1×N switch can decide to which delay line should the burst be sent. However, this policy of determining the buffering time upon entrance of the burst makes it difficult to dynamically adjust the buffering time of the burst according to the buffering state of the FDL, thus leading to low buffering efficiency.

In general, current implementing solutions of core switching node are basically the same, and generally include four main modules: optical crossover module, switching control module, protocol processing module, and line interface module. Switching control module comprises functions of signaling processing, forward table look-up, resource reservation, and contend decision and processing, etc. Protocol processing module mainly implements processing of high level protocol, including maintaining and update of forward table, etc. Optical crossover module is mainly composed of space divided crossover matrix, optical buffering FDL, and TWC, which coordinate to provide a transparent channel for data transmission under the control of configuration information provided by the switching control module. Line interface module comprises devices relevant to optical transmission such as optical multiplexer/demultiplexer (MUX/DEMUX) and erbium doped fiber amplifier (EDFA).

Since optical TWC is still under development, it is immature and expensive. Therefore, there is a need to improve the structure of optical switching node so as to reduce the requirement for TWC.

SUMMARY OF THE INVENTION

This invention presents a multi-plane OBS node architecture with internal speed-up, which provides high buffering efficiency of FDL and avoids the necessity of using TWC.

To facilitate explanation, we define the following notions:

Contention: when several bursts are to be switched to a specific wavelength channel of the same output port, "contention" occurs, which is also called "external congestion" in packet switch. In optical burst switching node, we adopt the same designation.

Switching plane: a switching array plane in a switch, i.e. a switching fabric of a optical burst (Andrzej Jajszcyk and T. Mouftah, "Photonic Fast Packet Switching," IEEE Communication Magazine, February 1993). The switching plane is connected with the core switching node's input and output ports by FDL and TWC in prior art, as shown in FIG. 3 and FIG. 8.

Throughput: the ratio of the number of bursts successfully switched and that of bursts arrived at the node.

According to one aspect of the invention, a multiple-plane OBS node comprising:

N input ports, N 1×N switches, N switching planes, $N^2$ FDLs, N optical couplers, and N output ports, each input port is connected with the input of a corresponding 1×N switches, the N outputs of each 1×N switch are connected with a corresponding input of each switching plane respectively, a corresponding output of each switching plane is connected with the input of the same corresponding optical coupler via a respective FDL, and each output port is connected with the output of a corresponding optical coupler, wherein N is an integer.

According to another aspect of the invention, a multiple-plane OBS node comprising:

N input ports, N 1×M switches, 2N×M FDL, M switching planes, N optical couplers, and N output ports, each input port is connected with the input of a corresponding 1×M switches, the M outputs of each 1×M switch are connected with a corresponding input of each switching plane respectively via a respective FDL, a corresponding output of each switching plane is connected with the input of the same corresponding optical coupler via a respective FDL, and each output port is connected with the output of a corresponding optical coupler, wherein N and M are integers and N>M.

In summary, the present invention has the following characteristics: (1) by arranging multiple switching planes, the internal bandwidth of the OBS node is increased so as to achieve the internal speed-up of the node. As the issue of "external congestion" is addressed, it is no longer necessary to use expensive TWC; (2) with the FDL of the present invention in combination with a new buffering policy, the buffering efficiency of the FDL is improved.

DETAILED DESCRIPTION OF PREFERRED EMBODIMENTS

Figure 4:
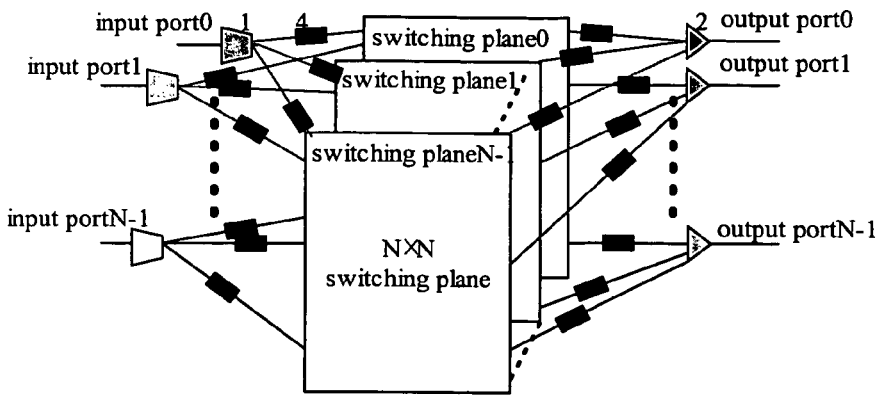
FIG. 4 is a schematic diagram of the multi-plane OBS node with internal speed-up according to the present invention.

FIG. 4 is a schematic diagram of the multi-plane OBS node with internal speed-up according to the present invention. The multi-plane OBS node comprises N (N is integer) switching planes 0~N−1, 2×$N^2$ FDL 4, N 1×N switches 1, N optical couplers 2, N output ports 0~N−1, and N input ports 0~N−1. Each input port is connected with a 1×N switch 1 and each output port is the output of its corresponding optical coupler 2. The N switching planes are connected parallelly, wherein a corresponding input of each switching plane is connected with the output of the same corresponding 1×N switch 1 via a respective FDL 4, and a corresponding output of each switching plane is connected with the input of the same corresponding optical coupler 2 via a respective FDL 4.

Figure 1:
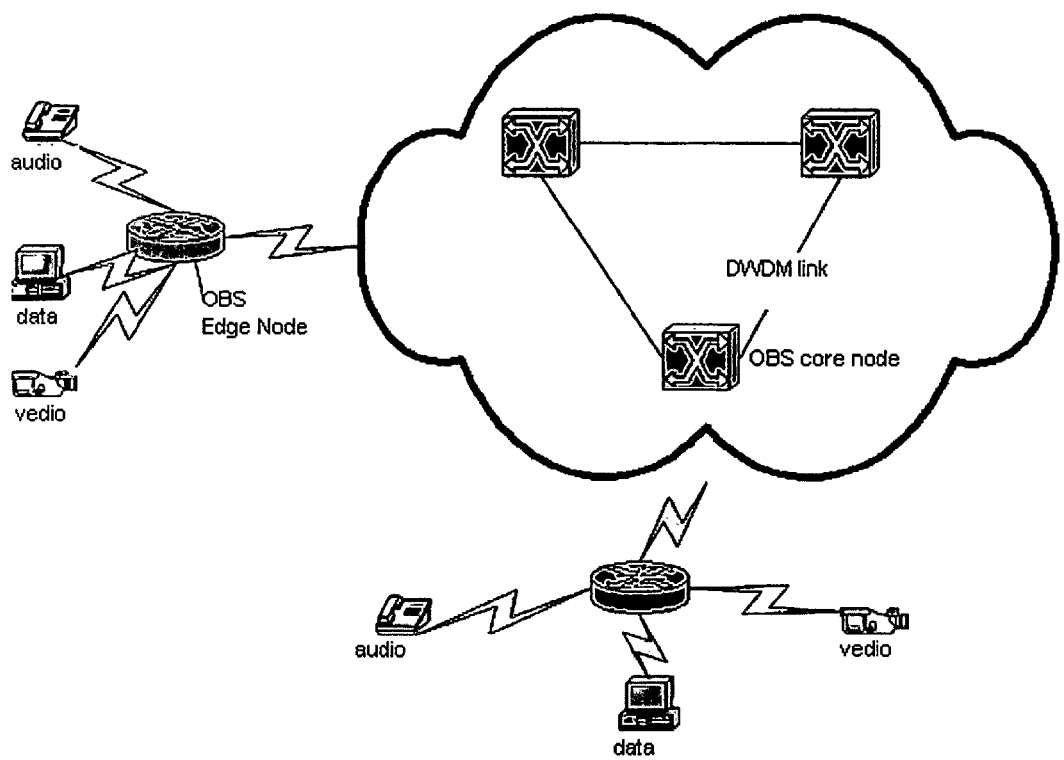
FIG. 1 is a schematic diagram of an OBS network.
Figure 2:
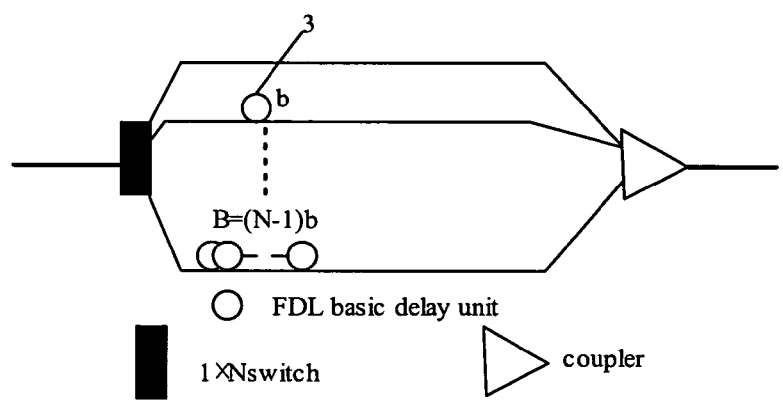
FIG. 2 is a schematic diagram of a conventional FDL.
Figure 3:
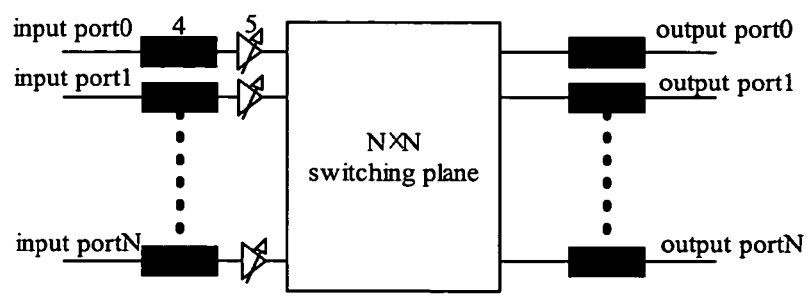
FIG. 3 is a schematic diagram of a conventional single plane OBS node.

It should be noted that among the 2×$N^2$ FDLs 4, $N^2$ FDLs 4 at the input ports are needed only when there are M switching planes (M<N). And in that case, the N 1×N switches 1 will be replaced by N 1×M switches. It should also be noted that the FDL can be a conventional FDL as shown in FIG. 2 and also can be a FDL according to the present invention as shown in FIG. 5.

Figure 5:
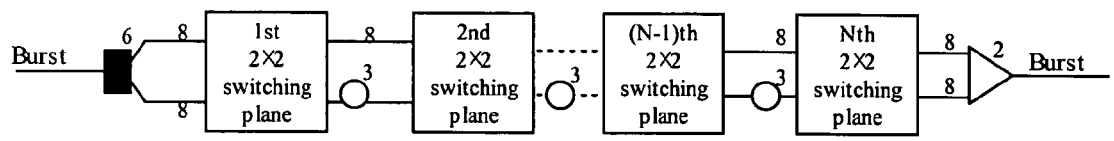
FIG. 5 is a schematic diagram of the FDL according to the present invention.

As shown in FIG. 5, the FDL according to the present invention comprises: a 1×2 switch 6 at the input port, short fiber lines 8, N 2×2 switching units, basic delay units 3, and an optical coupler 2 at the output port; wherein two short fiber lines 8 connect the output of the 1×2 switch 6 with the input of the first 2×2 switching unit; a short fiber line 8 and a basic delay unit 3 connect the first 2×2 switching unit with the second 2×2 switching unit, the second 2×2 switching unit with the third 2×2 switching unit, . . . , and the (N−1)th 2×2 switching unit with the Nth 2×2 switching unit; two short fiber lines 8 connect the output of the Nth 2×2 switching unit with the optical coupler 2; and optical bursts are output by the optical coupler 2.

The buffering policy adopted by the set of FDLs for the each output port of the present invention is as follows: when a burst arrives at the FDL, its specific delay time is not determined immediately. Instead, if the output port is busy, then the burst is put into the first basic delay unit. When the output port is free after the current burst's transmission is completed, the next burst to be output from the set of FDLs should be the one with the minimal value of a parameter Di, wherein Di refers to the distance from the burst in the respective FDL to its next 2×2 switching unit. The basic concept of this policy is to make the time interval between the output times of two succeeding bursts as small as possible, so as to improve the line usage of the output port of the FDL.

The FDL provides time delay in a range from 0 to B=(N−1)b, wherein b is unit time delay. By controlling each 2×2 switching unit, burst is switched to a short fiber line or a basic delay unit, so that various time delays can be provided.

Working procedure of the present invention:

When a burst arrives at the input port of the switching node, it is allocated to a free switching plane via a 1×N switch; the switching plane switches the burst to the FDL connected to its output port; when the output port is free, the burst is output therefrom.

Working principle of the present invention:

In FIG. 4, when N bursts contend for the same wavelength at the same output port, the N bursts can be switched toward the output port simultaneously by different switching planes and be buffered in the FDLs at the output ports. Then the N bursts are transmitted out of the output port successively according the FDL buffering policy. Here the internal bandwidth of the OBS node is N times of that with the conventional single switching plane, this is called internal speed-up. In this case, the contention is solved, so using of TWC is unnecessary.

The internal speed-up can be divided into two kinds, i.e. full internal speed-up and partial internal speed-up. For example, in FIG. 4, there are at most N bursts contending the same output port, the N bursts can be switched to the output port simultaneously if N switching planes are arranged, this is called full internal speed-up. Under full internal speed-up, contending bursts can be switched at the same time, thereby eliminating "external congestion". On the other hand, if the number of switching planes is less than N, which is called partial internal speed-up, "external congestion" cannot be eliminated completely.

When contention occurs, the existing single switching plane OBS node buffers the contending bursts in the FDLs at the input port, or finds an available switching path on another wavelength via the TWC for those contending bursts. However, as these operations are performed in a single switching plane, there is no internal speed-up in the switching node, so the issue of "external congestion" is not properly addressed. When network load is high, both of the above schemes are not able to achieve a good throughput. With the multi-plane architecture of the present invention, when a plurality of bursts contend for the same output port, these bursts can be switched simultaneously on different switching planes, buffered in FDLs at the output port and then sent out. In this way, the switching capacity of the switching node is increased substantially due to the internal speed-up. At the same time, since the issue of "external congestion" is properly addressed, the expensive TWC is no longer required. A good throughput can be achieved even under heavy network load.

Figure 6:
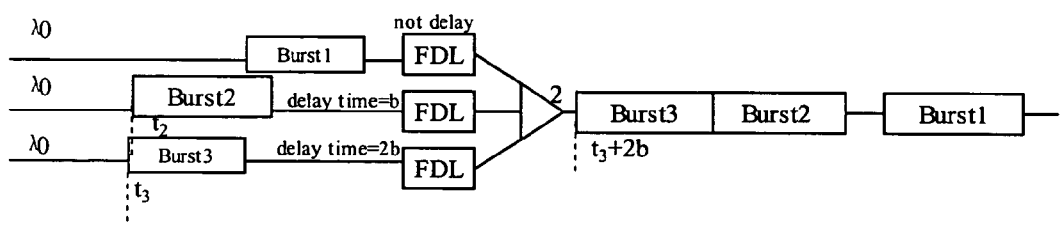
FIG. 6 shows a work example of a conventional FDL.
Figure 7:
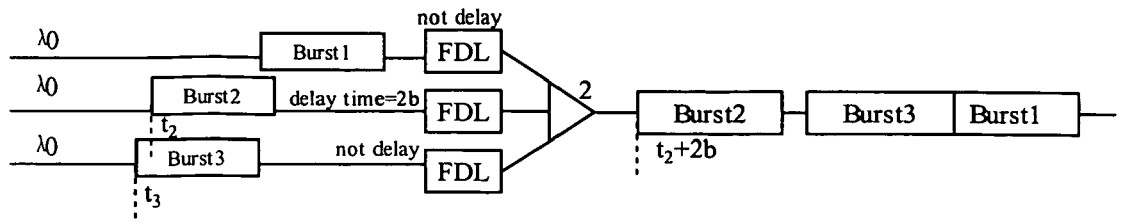
FIG. 7 shows a work example of the FDL according to the present invention.

The FDL of the present invention can achieve desirable buffering effect by using a new buffering policy. FIG. 6 and FIG. 7 illustrate a conventional FDL and the FDL of the present invention respectively, wherein the minimal unit time delay b of FDL is set to be the length of a burst.

According to the buffering policy of the conventional FDL, the specific time delay of a burst is determined before it enters the FDL. In FIG. 6, $\lambda 0$ refers to input wavelength, t2 and t3 are the time at which burst 2 and burst 3 arrive at the FDL respectively. When burst 2 arrives at the FDL, the output of the FDL is not free since the transmission of burst 1 has not ended, therefore burst 2 is buffered for a time of the minimal unit time delay b. In the same way, burst 3 will be buffered for a time of 2b. As a result, burst 3 will be the last one to leave the FDL, and the end time of the complete transmission of bursts 1~3 is t3+2b (b is the minimal unit time delay of FDL).

Whereas in FIG. 7, when burst 2 arrives at the FDL, the output of the FDL is not free since the transmission of burst 1 has not ended, therefore burst 2 is buffered for a time of the minimal unit time delay b. When the transmission of burst 1 at the output of the FDL is ended, the next burst to be output from the FDL is burst 3, since burst 3 is nearer to its next 2×2 switching unit than burst 2 is. The reason is that burst 3 comes immediately after burst 1, and when the transmission of burst 1 is ended, burst 3 arrives just at the first 2×2 switching unit of the FDL while burst 2 is buffered in its first basic delay unit. Therefore, the next burst output from the FDL is burst 3, and burst 2 is buffered for another time of b by the next basic delay unit. As a result, burst 2 will be the last one to leave the FDL and the end time of the complete transmission of bursts 1~3 is t2+2b. Since t2+2b<t3+2b, the buffering policy of the present invention reduces idle time slots and increases line usage of the output ports.

Figure 8:
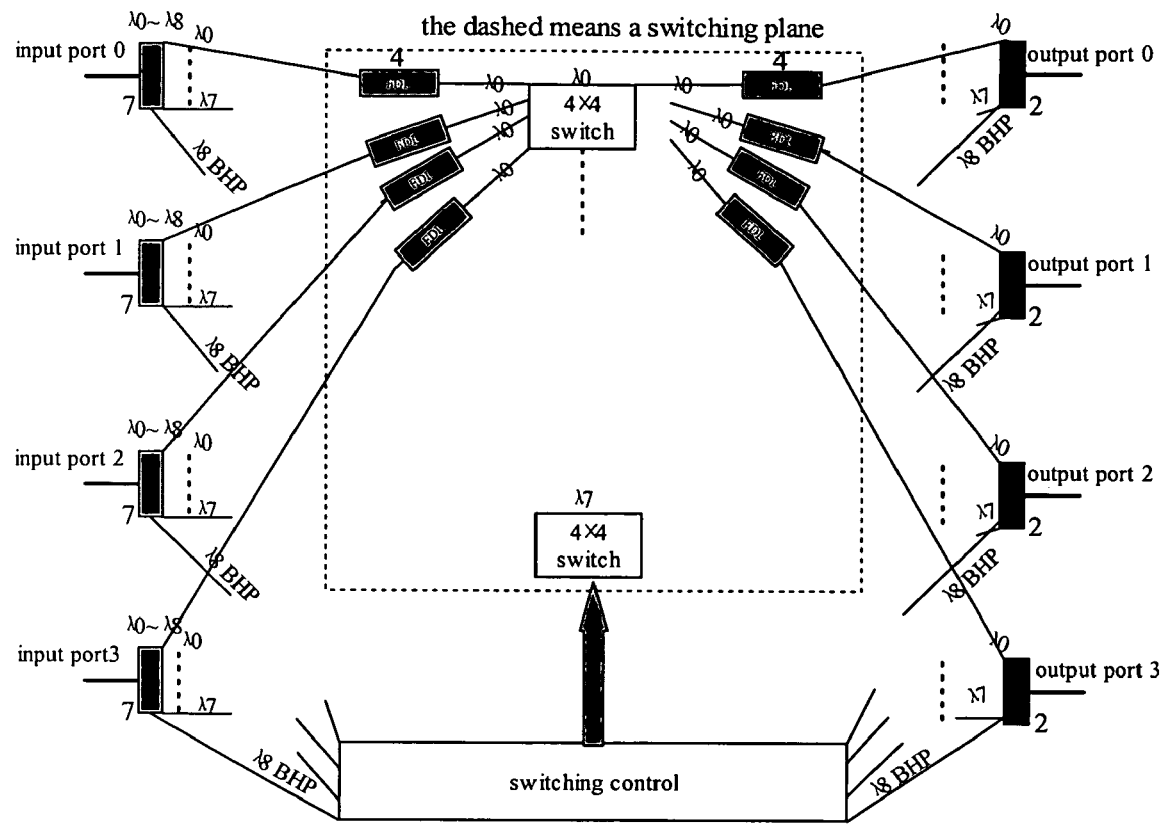
FIG. 8 shows a conventional single plane OBS node.

For a better understanding of the present invention, the configuration of the conventional single plane OBS node as shown in FIG. 8 will be described hereinafter. In the node, the switching plane comprises 8 4×4 switching modules and relevant FDLs 4. There are 4 input fibers and 4 output fibers, on each of which 9 wavelengths ($\lambda 0$~$\lambda 8$) are multiplexed, wherein $\lambda 0$~$\lambda 7$ are used for burst transmission and $\lambda 8$ is used for BHP transmission. The wave separator 7 demultiplexes multiple wavelengths multiplexed on an input fiber. The switching control module processes BHP information to arrange switching path for the incoming bursts. The optical coupler 2 multiplexes the wavelengths $\lambda 0$~$\lambda 8$ before send them to the output fiber.

Figure 9:
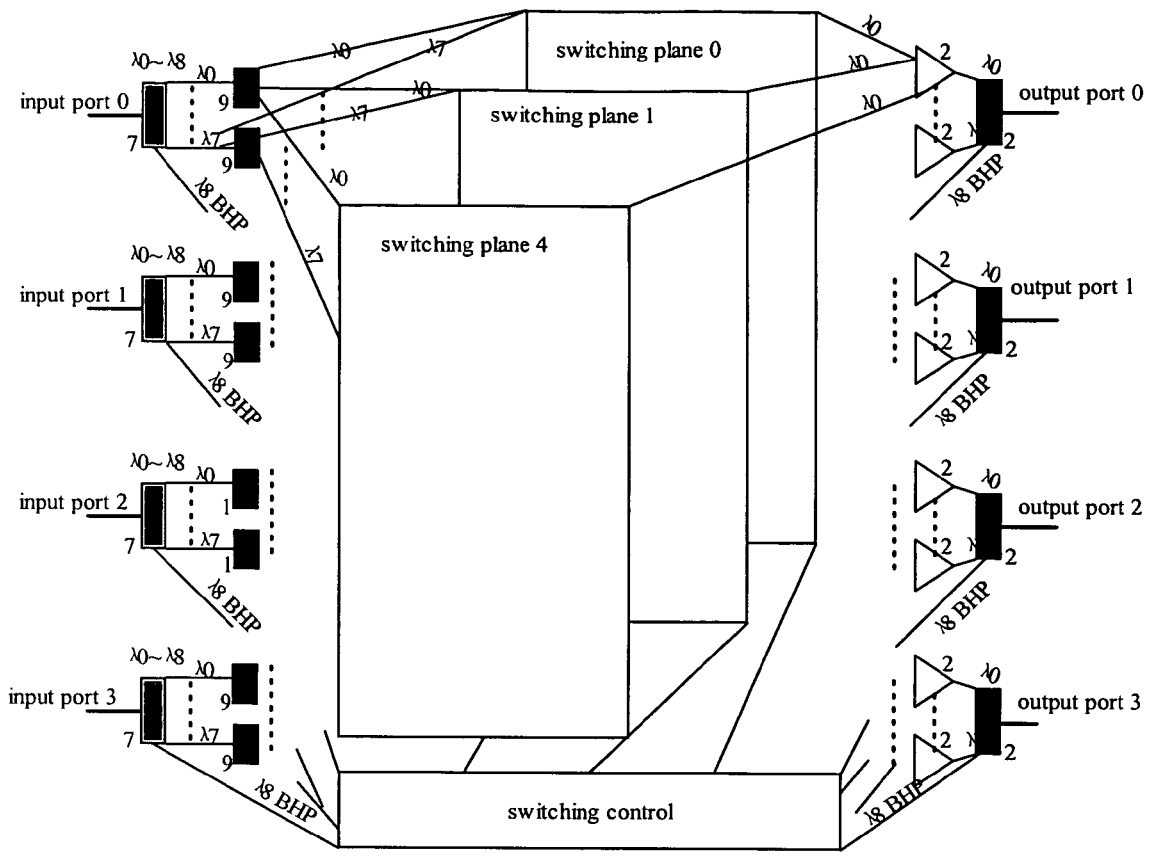
FIG. 9 shows the detailed configuration of the multi-plane OBS node according to the present invention.

FIG. 9 shows the detailed configuration of the OBS node with internal speed-up according to the present invention. The node includes 4 switching planes, each of which consists of 8 4×4 switching matrixes and necessary FDLs. There are 4 input fibers and 4 output fibers, on each of which 9 wavelengths ($\lambda 0$~$\lambda 8$) are multiplexed, wherein $\lambda 0$~$\lambda 7$ are used for burst transmission and $\lambda 8$ is used for BHP transmission. The transmission rate for each wavelength is 10 Gbps. Here, TWC is not required and the switching is performed between different fibers with the same wavelength. The BHP is input to the switching control module and processed to control the switching matrixes and the 1×4 switches, so that the bursts are switched to correct output ports.

In the node, there are at most 4 bursts contending for the same wavelength of the same output port simultaneously. The node is of full speed-up when N=4, and in that case, any incoming burst can be immediately switched. If N<4, it is necessary to add FDLs at the input ports of the switching planes to buffer those bursts which are not immediately served.

On the other hand, buffering at the output ports are always necessary to cope with a plurality of bursts arriving at the same wavelength of the same output port.

Figure 10:
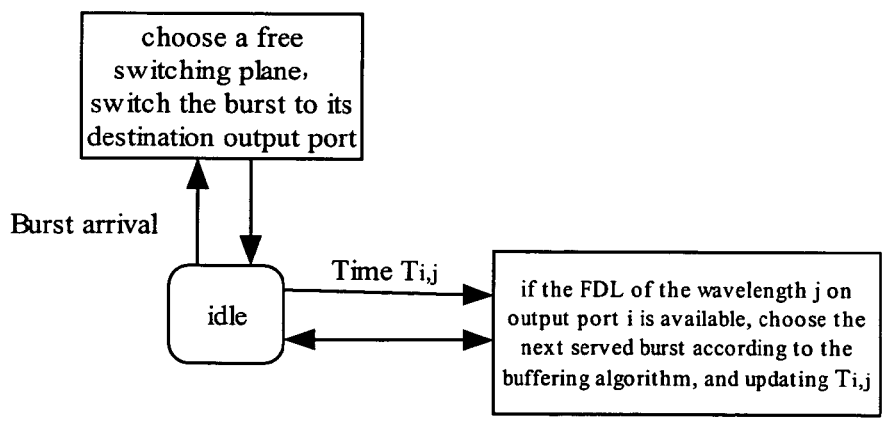
FIG. 10 is a work flow chart of the multi-plane OBS node according to the present invention.

The work process of the node is shown in FIG. 10. A switching resource table is established, which includes three entries, i.e. output port number i, wavelength number j, and idle start time $T_{i,j}$. After the time $T_{i,j}$, wavelength j at the output port i becomes idle (free).

Figure 11:
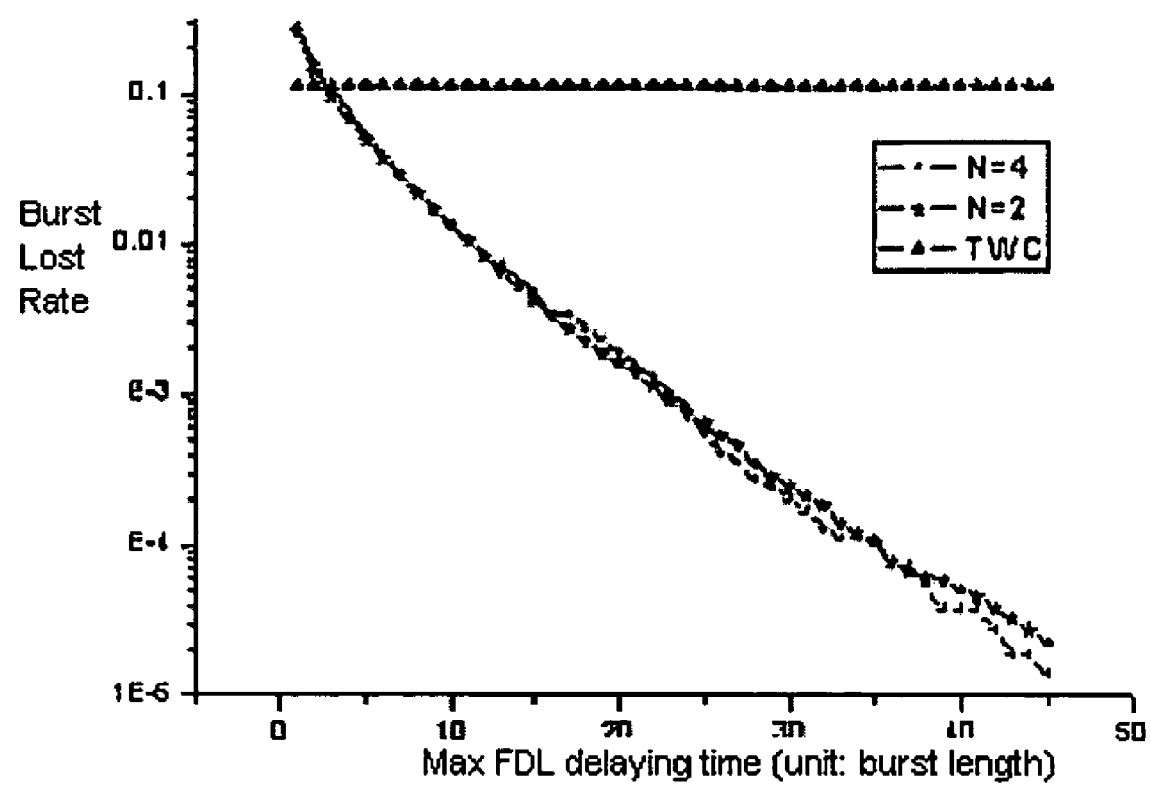
FIG. 11 is diagram of burst lost rate curve of the multi-plane OBS node under full speed-up and partial speed-up.

Emulation is carried out with respect to the node to obtain the relationship between burst lost rate and output port buffering. In the emulation, the minimal time delay of the FDL is set to a half of burst length. As shown in FIG. 11, when full speed-up is adopted, burst lost rate decrease sharply with the increase of the output port buffering. When the maximal time delay of the FDL is larger than 35 times of the burst length, burst lost rate can be controlled to be in the order of $10^{-5}$.

If partial speed-up is adopted (for example, N=2), a good switching performance is also achievable. In that case, the maximal time delay of the input port buffer is set to 12 times of the burst length (full speed-up do not need input port buffering), and network load is set to 0.8, then the emulation result is shown in FIG. 11. Thus it can be seen that partial speed-up can achieve the same performance as that of full speed-up. For example, when the maximal time delay of the output port buffer of the FDL is about 35, the burst lost rate is in the order of $10^{-5}$ for both cases.

Nevertheless, the cost for achieving good performance with partial speed-up is the introduction of input port buffering, which results in an increased average time delay of the burst. Actually, the average time delay is 2.546 times of burst length when N=2, and 2.479 times of burst length when N=4.

In summary, the OBS node according to the present invention obviates the need for using expensive TWC by increasing the internal bandwidth of the node. In the case of full speed-up, the burst lost rate is controlled in the order of $10^{-5}$ by properly setting buffer size of the output port FDL and the minimal unit time delay. Further more, by adopting the FDL of the present invention at the input port, the burst lost rate of the same order as that under full speed-up can be achieved under partial speed-up (N=2), while the average time delay of burst shows little increase.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A multiple-plane OBS node comprising:
N input ports, N 1×N switches, N switching planes, $N^2$ fiber delay lines (FDLs), N optical couplers, and N output ports, each input port is connected with the input of a corresponding 1×N switches, the N outputs of each 1×N switch are connected with a corresponding input of each switching plane respectively, a corresponding output of each switching plane is connected with the input of the same corresponding optical coupler via a respective FDL, and each output port is connected with the output of a corresponding optical coupler, wherein N is an integer and $N \geq 2$;
wherein each of the FDLs comprises:
a 1×2 switch at the input of the FDL, N 2×2 switching units, and an optical coupler at the output of the FDL, two short fiber lines connect the output of the 1×2 switch with the input of the first 2×2 switching unit; a short fiber line and a basic delay unit connect the first 2×2 switching unit with the second 2×2 switching unit, the second 2×2 switching unit with the third 2×2 switching unit, . . . , and the (N−1)th 2×2 switching unit with the Nth 2×2 switching unit; two short fiber lines connect the output of the Nth 2×2 switching unit with the input of the optical coupler;
wherein buffering policy adopted by each set of FDLs for each output port is as follows:
when a burst arrives at a FDL, if the output port is busy, then the burst is put into the first basic delay unit of the FDL; and
when the output port is free after the current burst's transmission is completed, the next burst to be output from the set of FDLs should be the one with the minimal value of a parameter Di, wherein Di refers to the distance from the burst in the respective FDL to its next 2×2 switching unit.

2. A multiple-plane OBS node comprising:
N input ports, N 1×M switches, 2N×M fiber delay lines (FDLs), M switching planes, N optical couplers, and N output ports, each input port is connected with the input of a corresponding 1×M switches, the M outputs of each 1×M switch are connected with a corresponding input of each switching plane respectively via a respective FDL, a corresponding output of each switching plane is connected with the input of the same corresponding optical coupler via a respective FDL, and each output port is connected with the output of a corresponding optical coupler, wherein N and M are integers, $M \geq 2$ and N>M;
wherein each of the FDLs at the output port side comprises:
a 1×2 switch at the input of the FDL, N 2×2 switching units, and an optical coupler at the output of the FDL, two short fiber lines connect the output of the 1×2 switch with the input of the first 2×2 switching unit; a short fiber line and a basic delay unit connect the first 2×2 switching unit with the second 2×2 switching unit, the second 2×2 switching unit with the third 2×2 switching unit, . . . , and the (N−1)th 2×2 switching unit with the Nth 2×2 switching unit; two short fiber lines connect the output of the Nth 2×2 switching unit with the input of the optical coupler;
wherein buffering policy adopted by each set of FDLs for each output port is as follows:
when a burst arrives at the FDL, if the output port of the FDL is busy, then the burst is put into the first basic delay unit; and
when the output port is free after the current burst's transmission is completed, the next burst to be output from the set of FDLs should be the one with the minimal value of a parameter Di, wherein Di refers to the distance from the burst in the respective FDL to its next 2×2 switching unit.

* * * * *